United States Patent
Kallqvist (10) Patent No.: US 7,813,325 B2
(45) Date of Patent: Oct. 12, 2010

(54) LOCATION INFORMATION COMMUNICATION

(75) Inventor: Claes Kallqvist, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 400 days.

(21) Appl. No.: 11/466,183

(22) Filed: Aug. 22, 2006

(65) Prior Publication Data

US 2007/0206549 A1 Sep. 6, 2007

Related U.S. Application Data

(60) Provisional application No. 60/778,413, filed on Mar. 3, 2006.

(51) Int. Cl.
 *H04W 4/00* (2009.01)
(52) U.S. Cl. ..................................................... 370/338
(58) Field of Classification Search .................. None
 See application file for complete search history.

(56) References Cited

U.S. PATENT DOCUMENTS

| | | | |
|---|---|---|---|
| 6,205,089 B1 * | 3/2001 | Itoh ............................ | 368/10 |
| 6,661,787 B1 * | 12/2003 | O'Connell et al. .......... | 370/389 |
| 6,697,380 B1 * | 2/2004 | Egbert et al. ................ | 370/469 |
| 2004/0201473 A1 * | 10/2004 | Lee ............................. | 340/531 |
| 2005/0130680 A1 | 6/2005 | Northcutt | |
| 2006/0111143 A1 * | 5/2006 | Pande et al. ............... | 455/556.1 |
| 2007/0064644 A1 * | 3/2007 | Dowling et al. ............. | 370/328 |
| 2007/0070935 A1 * | 3/2007 | Prakash et al. .............. | 370/328 |
| 2007/0150941 A1 * | 6/2007 | Jachner ......................... | 726/5 |
| 2007/0155416 A1 * | 7/2007 | Donnellan .................. | 455/518 |
| 2007/0299605 A1 * | 12/2007 | Onishi et al. ................ | 701/208 |
| 2008/0004010 A1 * | 1/2008 | Boberg et al. ............ | 455/435.1 |
| 2008/0036778 A1 * | 2/2008 | Sheha et al. ................ | 345/502 |

FOREIGN PATENT DOCUMENTS

| | | | |
|---|---|---|---|
| GB | 2405555 A | * | 3/2005 |
| WO | WO 98/52379 | | 11/1998 |
| WO | WO 03/084258 A1 | | 10/2003 |
| WO | WO 2005/088949 A1 | | 9/2005 |
| WO | WO 2006/060342 A2 | | 6/2006 |

OTHER PUBLICATIONS

International Search Report and Written Opinion dated Jan. 11, 2008 issued in corresponding PCT application No. PCT/EP2007/052943, 16 pages.

H. Schulzrinne et al.: RPID: Rich Presence Extensions to the Presence Information Data Format (PIDF); Internet Engineering Task Force, vol. (simple) No. 10, Dec. 20, 2005, 40 pages.

J. Rosenberg: Presence Authorization Rules; Internet Engineering Task Force, vol. (simple) No. 4, Oct. 24, 2005, 27 pages.

* cited by examiner

*Primary Examiner*—Chirag G Shah
*Assistant Examiner*—Amarnauth Persaud
(74) *Attorney, Agent, or Firm*—Harrity & Harrity, LLP (57) ABSTRACT

A method may include obtaining location descriptor information regarding the location of a first communication device. The method may also include displaying the location of the first communication device by a second communication device. The location descriptor information may be requested by the user of the second communication device to enable the user of the second communication device to determine the location of the user of the first communication device.

7 Claims, 4 Drawing Sheets

LOCATION INFORMATION COMMUNICATION

RELATED APPLICATIONS

This application claims priority under 35 U.S.C. §119 based on U.S. Provisional Application Ser. No. 60/778,413, filed Mar. 3, 2006, the disclosure of which is incorporated herein by reference.

TECHNICAL FIELD OF THE INVENTION

The invention relates in general to communication of location information. More particularly, the invention relates to obtaining and/or providing location descriptor information.

DESCRIPTION OF RELATED ART

Since mobile phones no longer are used only for making phone calls, but for communicating information messages of many kinds including, SMS, MMS, IMS, etc., the mobile phones are seldom switched off.

It is therefore important to be able to set a user's accessibility, such as from whom a user can accept a phone call and with whom a user presently does not wish to communicate. Presently, entries about one's availability status may be made into the calendar of a mobile phone, which calendar of course may be subject to synchronization with a corresponding calendar in another computer system, typically a personal computer or a larger server based computer system.

In some instances, a user of a one mobile phone can gain information about the geographical position of another mobile phone being used by another user. If the user does not have sufficient knowledge about the geographical position, however, he or she may fail to take advantage of such geographical position information, such as using it adapt the volume of a voice call to the callee. In order to make use of information without sufficient prior knowledge of geographical position information, knowledge or supplementary information may have to be gained in a further processing step by the user. This is an inconvenience to the user seeking such information.

There is hence a need to overcome the limitations of such prior art technique and to provide a technique with which a user of a portable communication device can automatically gain access to information about the location of another portable communication device, which information is easily and quickly understandable.

SUMMARY OF THE INVENTION

Aspects of the invention are directed toward gaining knowledge about the geographical location circumstances with respect to a user of a portable communication device. For example, aspects of the invention provide a method of automatically obtaining information about the geographical location circumstances with respect to a user of a portable communication device.

According to a first aspect, a method of obtaining location descriptor information of a first portable communication device comprises the steps of sending a request for location descriptor information to at least a network service provider of the first portable communication device and receiving location descriptor information from at least the network service provider of the first portable communication device. The method also includes enabling presentation of the received location descriptor information by a second portable communication device and providing the user of the second portable communication device with the location descriptor information without requiring further processing by the user. The location descriptor information may be provided in a format that is easy to understand by the user.

A second aspect is directed toward a method including the features of the first aspect and further comprising the step of detecting a request for location descriptor information of the first portable communication device.

A third aspect is directed toward a method including the features of the second aspect, wherein the step of sending the request comprises sending the request from the second portable communication device.

A fourth aspect is directed toward a method including the features of the third aspect, wherein the step of detecting the request is performed by a second portable communication device in dependence of user input.

A fifth aspect is directed toward a method including the features of the second aspect, wherein the step of detecting the request is performed by a second portable communication device in dependence of user input.

A sixth aspect is directed toward a method including the features of the first aspect, wherein the step of sending the request comprises sending the request from the second portable communication device.

A seventh aspect is directed toward a method including the features of the first aspect, wherein the step of providing the location descriptor information comprises providing at least one of an image file or a video file to the user of the second portable communication device.

Additional aspects of the invention provide a method of automatically providing knowledge about the geographical location circumstances with respect to a user of a portable communication device.

According to an eighth aspect, a method of providing location descriptor information of a first portable communication device comprises the steps of receiving a request for location descriptor information of the first portable communication device and obtaining location information of the first portable communication device. The method also includes obtaining location descriptor information based on the obtained location information and sending location descriptor information of the first portable communication device at least to a network service provider of a second portable communication device for enabling presentation of the location descriptor information by the second portable communication device.

A ninth aspect is directed toward a method including the features of the eighth aspect, wherein the step of receiving the request comprises receiving the request from the second portable communication device.

Still further aspects of the invention provide a portable communication device that automatically obtains knowledge about the geographical location circumstances with respect to a user of a portable communication device.

According to a tenth aspect, a portable communication device for obtaining location descriptor information of another portable communication device comprises a transceiving unit arranged to send a request for location descriptor information and to receive location descriptor information and a visual information presentation unit configured to present location descriptor information. The portable communication device also includes a control unit configured to control sending the request for location descriptor information, receive the location descriptor information and enable presentation of the received location descriptor information to allow a user of the portable communication device to automatically view the location descriptor information via the visual information presentation unit without further processing by the user.

An eleventh aspect is directed toward a portable communication device including the features of the tenth aspect, further comprising a user input unit configured to receive user input, and wherein the control unit is further configured to detect a request for location descriptor information in response to received user input.

A twelfth aspect is directed toward a portable communication device including the features of the eleventh aspect, wherein the portable communication device is a mobile phone.

A thirteenth aspect is directed toward a portable communication device including the features of the tenth aspect wherein the portable communication device is a mobile phone.

Still additional aspects of the invention provide an electronic communication device for automatically providing knowledge about the geographical location circumstances with respect to a user of a portable communication device.

According to a fourteenth aspect, an electronic communication device for providing location descriptor information of a first portable communication device is configured to receive a request for location descriptor information of the first portable communication device, obtain location information of the first portable communication device, obtain location descriptor information based on the obtained location information, and send location descriptor information of the first portable communication device at least to a network service provider of a second portable communication device, for enabling presentation of the location descriptor information by the second portable communication device.

Additional aspects of the invention provide a computer program product for automatically enabling obtaining knowledge about the geographical location circumstances with respect to a user of a portable communication device.

According to a fifteenth aspect a computer program product is provided comprising a computer readable medium having stored thereon computer readable code means, to make a computer or a portable communication device execute, when said computer readable code means is loaded in the computer or the portable communication device, a method comprising sending of a request for location descriptor information of a first portable communication device, to at least a network service provider of the first portable communication device, for obtaining location descriptor information. The method also includes receiving location descriptor information from at least the network service provider and enabling presentation of the received location descriptor information to allow the user of a second portable communication device to automatically gain information that is easy to understand without the need of further processing by the user.

Further aspects of the invention provide a computer program product for automatically enabling providing knowledge about the geographical location circumstances with respect to a user of a portable communication device.

According to a sixteenth aspect, a computer program product comprises a computer readable medium having thereon computer readable code means, to make a computer or a electronic communication device execute, when said computer readable code means is loaded in the computer or the electronic communication device, a method comprising receiving of a request for location descriptor information of a first portable communication device for providing location descriptor information and obtaining location information of the first portable communication device. The method also includes obtaining location descriptor information based on the obtained location information and sending the location descriptor information of the first portable communication device to a network service provider associated with the computer or electronic communication device for enabling presentation of the location descriptor information by the computer or electronic communication device.

According to a seventeenth aspect, a communication device is provided. The communication device comprises a transmitter configured to transmit a request for location information associated with a second communication device. The communication device also includes a receiver configured to receive an image file or video file in response to the request, where the image file or video file comprises the information identifying a first location at which the second communication device is located. The communication device further comprises a display configured to display the received image file or video file.

According to an eighteenth aspect, the receiver of the communication device is configured to receive an image file in response to the request, where the image file comprises information identifying the first location and a time at the first location.

According to a nineteenth aspect, the receiver of the communication device is configured to receive a video file in response to the request, where the video file comprises a video clip associated with the first location and a time at the first location.

According to a twentieth aspect, the image file or video file comprises personalized information provided by a user of the second communication device.

According to a twenty first aspect, a method in a first communication device comprises sending a request for location information associated with a second communication device. The method also includes receiving an image file or video file in response to the request, where the image file or video file comprises information identifying a first location at which the second communication device is located. The method further includes displaying the received image file or video file.

According to a twenty second aspect, the displaying comprises displaying the received image file or video file prior to commencing with an audio communication session with a user of the second communication device.

Aspects of the invention provide, among other things, a means to quickly learn or determine a location of a user of a portable communication device. In addition, aspects of the invention allow a user to advantageously receive information regarding the location of the user of the portable communication device prior to setting up a voice or video communication session between parties.

It should be emphasized that the term "comprises/comprising" when used in this specification is taken to specify the presence of stated features, integers, steps or components, but does not preclude the presence or addition of one or more other features, integers, steps, components, or groups thereof.

BRIEF DESCRIPTION OF THE DRAWINGS

Aspects of the invention will now be described in more detail in relation to the enclosed drawings, in which.

DETAILED DESCRIPTION OF THE EMBODIMENTS

Aspects of the invention are directed toward gaining knowledge about the geographical location circumstances with respect to a user of a portable communication device. For example, in aspects of the invention, location information of a first portable communication device, such as a mobile phone, may be available to a network service provider and/or accessible to the network service provider. One example of such location information may identify where a first mobile phone is situated, such as a city, state and/or country, or more specific information, such as a street address within a city, a location such as an airport, train station, shopping mall, etc. Upon a request from a user of a second portable communication device, such location information may be automatically sent to user of second portable communication device. Gaining readily understandable information that a friend/colleague is in, for example, Istanbul, Turkey and that the local time is 4:30 AM, may be a very useful piece of information Indirectly, the information may also be used to let a user know that a friend/colleague is not in transit to a destination, but has arrived at his/her destination (Istanbul in this example).

Figure 1:
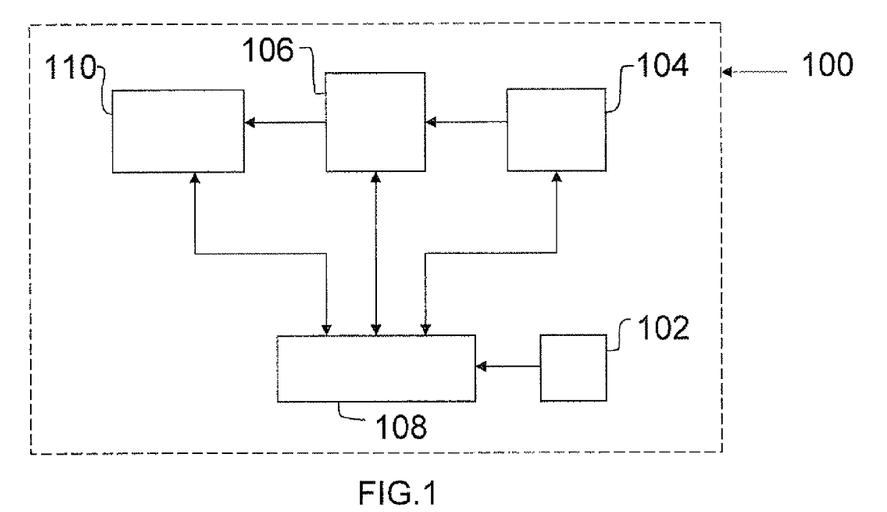
FIG. 1 schematically shows an exemplary portable communication device.
Figure 2:
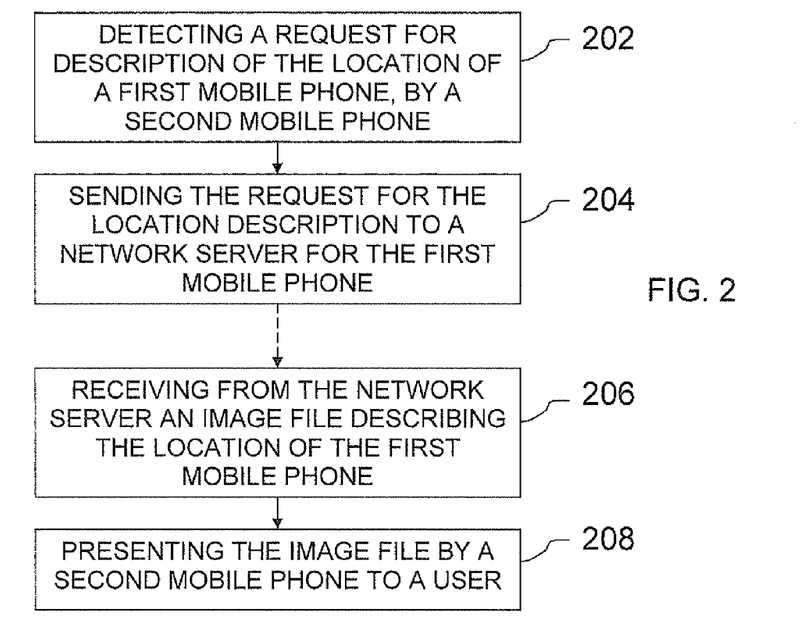
FIG. 2 is an exemplary flow chart of a method of obtaining location descriptor information according to one exemplary embodiment.

With reference to FIGS. 1 and 2, schematically showing a portable communication device 100, according to an exemplary embodiment and a flow chart of a method of obtaining location descriptor information according to an exemplary embodiment respectively, the invention is now explained in more detail.

According to one embodiment, the portable communication device 100 comprises a user input unit 102, a transceiving unit 104, a memory unit 106, a control unit 108, and an information presentation unit 110. As shown in FIG. 1, the control unit 108 is connected to all other units (i.e., user input unit 102, transceiving unit 104, memory unit 106, and information presentation unit 110). Moreover, the memory unit 106 may be connected to the transceiving unit 104 and to the information presentation unit 110, according to this embodiment.

Figure 3:
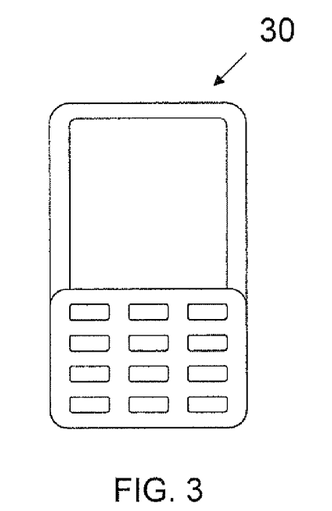
FIG. 3 illustrates a portable communication device in the form of a cellular phone, according to one exemplary embodiment, FIG. 4 schematically illustrates a communication system communicating location descriptor information.
Figure 4:
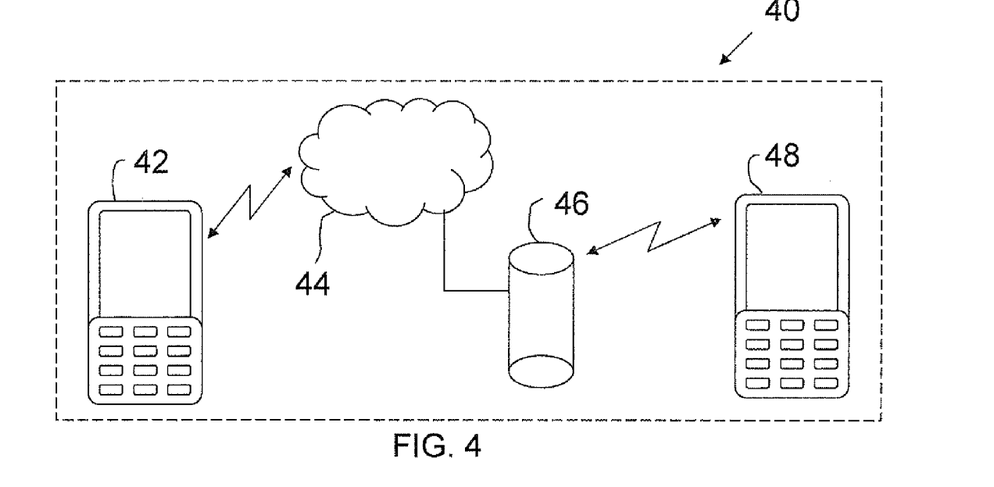

Reference will also be given to FIGS. 3 and 4, displaying a portable communication 30 device in the form of a cellular phone and a schematic diagram illustrating an exemplary communication system 40 communicating location descriptor information, respectively. System 40 includes a second portable communication device in the form of a mobile phone 42, a network service provider 44 of the second portable communication device 42, a network service provider in form of an electronic communication device or a communication server 46 (also referred to as a network server 46), and a first portable communication device 48 in the form of a mobile phone, according to one exemplary embodiment. In an exemplary embodiment, portable communication devices 30, 42 and 48 may be configured in a similar manner as portable communication device 100.

The method for which the flow chart is presented in FIG. 2 begins with the step of detecting a request for description of the location of a first mobile phone 48, being one example of a portable communication device, by a second mobile phone 42, again being one example of a portable communication device (step 202). In dependence of user input via the user input unit 102, this request for description of the location may be detected by the control unit 108.

According to an alternative embodiment, the step of detecting a request for description of the location may be performed elsewhere, such as for instance by the network service provider 44 of the second mobile phone 42. In this implementation, with respect to the second mobile phone 42, the request for description of the location of mobile phone 48 may be considered to be automatically generated since it is generated by the network service provider 44 and no user input associated with mobile phone 42 is required. In other words, in this embodiment, the request is performed independent of user input via the user input unit 102 of the second mobile phone 42.

Having requested a description of the location of the first mobile phone 48 in step 202, the request for the location description is sent to a network server 46 of the first mobile phone 48 (step 204). This step may include sending the request to a particular server, such as server 46, that is able to obtain relevant location related information associated with the first mobile phone 48.

After executing step 204, the method of obtaining location description information regarding the location of mobile phone 48 (for which the flow chart is presented in FIG. 2) includes awaiting a positive response to the sent request. For this reason and to follow the processing of the request as performed above, the method of providing description of the location of the first mobile phone 48 will now be discussed with respect to the flow chart of FIG. 5.

Figure 5:
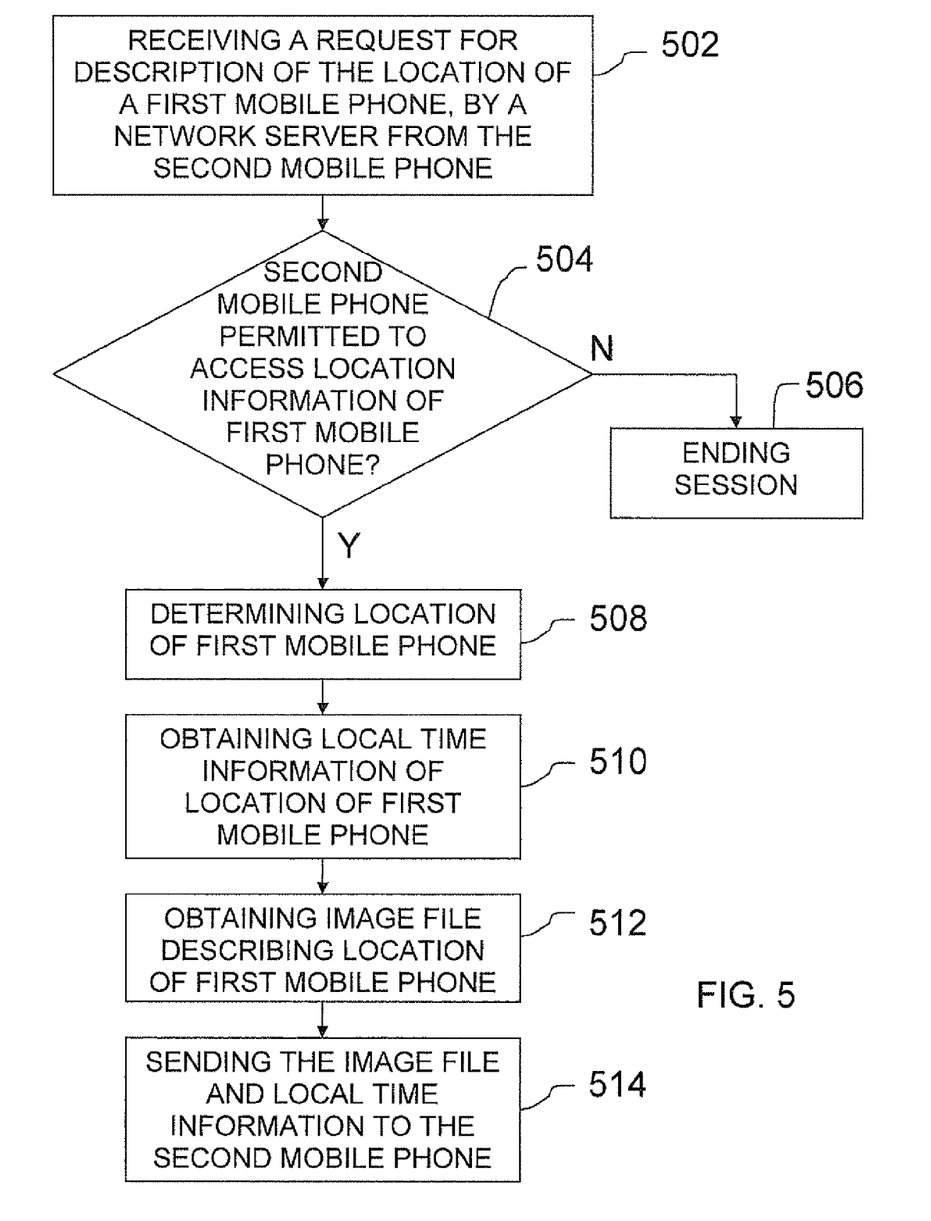
FIG. 5 is an exemplary flow chart of a method of providing location descriptor information according to an exemplary embodiment.
Figure 6:
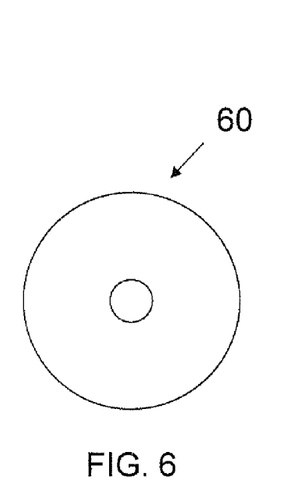
FIG. 6 illustrates a computer program product, having thereon computer program code means to make a device or a computer execute steps consistent with exemplary embodiments.

Referring to FIG. 5, the method may begin by receiving the request for description of the location of the first mobile phone 48, wherein the network server 46 receives the request from the second mobile phone 42 (act 502), according to one exemplary embodiment. For clarity it should be mentioned that the request being received at this step (i.e., step 502), is the request that was sent in step 204 in the method of obtaining location information in FIG. 2.

According to an alternative embodiment, the request received by the network server 46 in step 502 may be received from the network service provider 44 of the second mobile phone 42. The request for location information may thus originate from different sites, as was indicated above in connection with the flow chart of FIG. 2.

According to one embodiment, having received the request for location description information in step 502, the network server 46 of the first mobile phone 48 determines whether the second mobile phone 42 has been given permission by the first mobile phone 48 to access location information of the first mobile phone 48 (step 504).

User settings of various types by which permission may be granted to, for example, a subgroup of a user's contacts may be used. Alternatively, granting permission to access location information during working hours for one subgroup and permission to access location information during a different time interval by a second subgroup, such as, for example, a 24-hour basis, may be used to mention a few examples only If it is determined in step 504, by the network server 46, that the second mobile phone 42 is not granted permission to access location information of the first mobile phone 48, the session may end (step 506).

If, however, it is determined by the network server 46 in step 504 that the second mobile phone 42 is granted permission to access location information of the first mobile phone 48, the location of the first mobile phone 48 may be determined (step 508), preferably by the network server 46.

The network server 46 typically has access to location information of the first mobile phone 48, but may have to determine such information more accurately depending on the precision of location information that is requested, according to an alternative embodiment.

Determining geographical position and location per se is well known to the skilled person and includes a number of ways to perform such a task. Such steps, therefore, will not be described in detail herein in order to not unduly obscure the thrust of the invention. It should also be understood that aspects of the invention are not limited to any particular method of determining location/geographical information.

Having determined the location of the first mobile phone 48 in step 508, information about the local time for that location of the first mobile phone may be obtained (step 510). With information about the location of the first mobile phone 48 and the local time of the location of which information was obtained, an image file may be obtained describing the location, preferably at that time of the day (step 512). For example, the image file may describe and/or illustrate how the location may look at 7:30 AM, such as an image file illustrating the sun coming up at that particular location. Within this step (i.e., step 512), explicit information about the time may also be obtained. That is, the local time at the particular location may be obtained. According to an exemplary embodiment this step may be performed by the network server 46.

However, according to another embodiment, location information may be received by other servers or networks, such as local area networks or hot spots, providing local descriptions of the location of the first mobile phone 48. This may be on request from the network server 46 or may be executed without a request from the network server 46, while the first mobile phone 48 is within the reach of the local area network of the hot spot, for instance. According to yet a different embodiment location descriptions may comprise moving pictures, such as video clips, associated with the particular location. This may include live video clips of the particular location or stored video clips associated with the particular location.

Alternatively, in some implementations, description information may be received from the user of the first mobile phone 48, whereby such descriptions may be stored, for example, in the network server 46. In such implementations, the particular descriptions to be presented to the user of the second mobile phone 42 may be descriptions that the user of the first mobile phone 48 would like seekers of location information, such as users of second mobile phone 42, to experience. For example, the description may include (for the example above in which the user is in Istanbul, Turkey) "I'm here in Istanbul, Turkey having a good vacation" or any other particular description information that the user of first mobile phone 48 would like to present to another mobile phone user, such as the user of second mobile phone 42.

In addition, interactive video files comprising audio and video information may similarly be obtained as the location descriptor information of the first mobile phone 48, according to another embodiment of the present invention. The interactive video files may be provided in addition to text providing location description information or may be provided without accompanying text providing a location descriptor.

Having obtained a description in step 512, containing location information and preferably including explicit time information, the step of sending the image file and the local time information to the second mobile phone 42 is executed (step 514). According to an alternative implementation, the image and time information may be sent to the network service provider 44 or a network server associated with the second mobile phone 42, for subsequent sending to the second mobile phone 42.

Returning to FIG. 2, as location information has been sent, the method of obtaining location descriptor information or description about the location (schematically presented in the flow chart in FIG. 2), an image file describing the location of the first mobile phone 48 may be received from, for example, the network server 46 and/or network service provider 44 (step 206). This information may be provided when the request for information was successfully processed by the server 46.

In the case the second mobile phone 42 was not granted permission to access location information of the first mobile phone 48, a time out may be executed and the method of providing is ended, as earlier described in connection with step 506.

Having received from either the network service provider 44 of the second mobile phone 42 of directly from the network server 46 of the first mobile phone 48, an image file describing the location of the first mobile phone 48, the second mobile phone 42 presents and/or displays the image file to a user of second mobile phone 42 (step 208).

Presenting the image file may preferably be performed by using the information presentation unit 110 of the portable communication device 100 as shown in FIG. 1. The user of the second mobile phone 42 can thereby obtain information about the location circumstances of the user of the first mobile phone 48. For example, the user of the second mobile phone 42 may view the image file, which may include a video clip and/or message as described above. In some implementations, the video clip and/or message may be personalized by the user of first mobile phone 48. For example, the video clip may be a short video clip taken by the user of the first mobile phone 48 along with audio provided by the user of the first mobile phone 48. Alternatively, the video clip may be a pre-stored video clip associated with the location of the user of the first mobile phone 48.

In some embodiments consistent with the invention, the location description information provided to a user of a communication device, such as second mobile phone 42 may be provided prior to setting up a voice and/or video communication session with a user of for example, first mobile phone 48. That is, the location information may be provided without the user of second mobile phone 42 actually placing and/or completing a call to the user of first mobile phone 42. In this manner, if the user of second mobile phone 42 determines that the user of the first mobile phone 48 is located at a train station, for example, the user of second mobile phone 42 may speak in a louder voice to the user of first mobile phone 48 when a call to the first mobile phone 48 is completed. In other implementations, the location information may be provided concurrently with the completion of a call to the first mobile phone 48.

According to one aspect consistent with the invention, a computer program product, for instance in the form of a CD-ROM disc, may be provided. The computer program product may comprise a computer readable medium having thereon computer readable code means, to make a computer or a device execute steps of a method consistent with the invention, when said program code means is loaded in the computer or the device.

Figure 7:
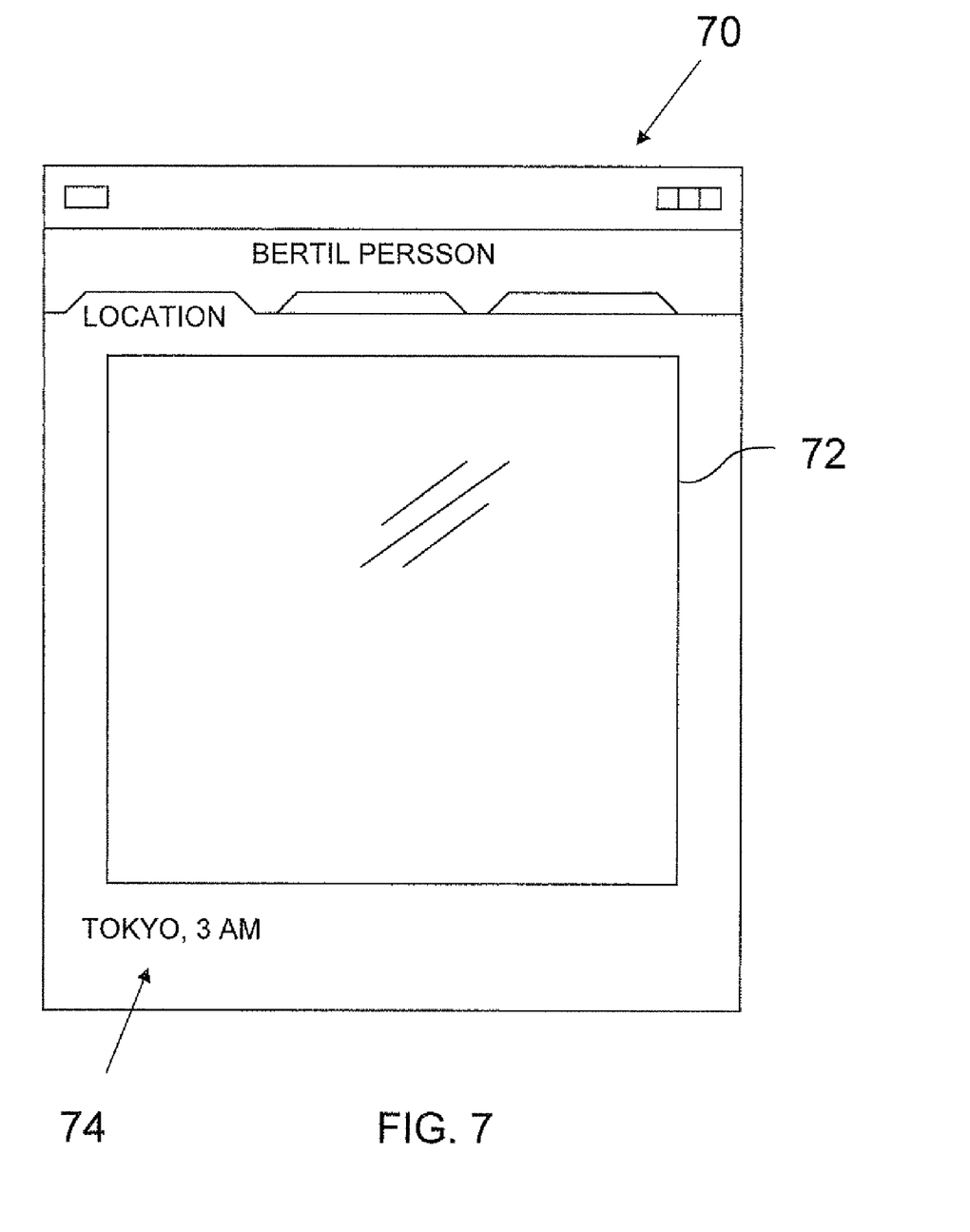
FIG. 7 illustrates a display showing one example of location descriptor information in the form of an image and local time information.

In addition, FIG. 7 schematically presents one example of information that may be presented via an information presentation unit 110 of a mobile phone. According to this embodiment, the view provided by the information presentation unit 110 may schematically be visualized as FIG. 7, where the information presentation unit 110 typically is a display, such as a liquid crystal display (LCD) or some other display of a mobile phone. In this example, the image information (e.g., is denoted by 72 and the combined explicit time information together with location information which both were received, is denoted with 74, being "TOKYO, 3 AM" in this example.

The image information 72 may be an image file, a video clip, etc., as described above. Other explicit information, such as names, as well as time information showing a clock, may be incorporated in the image information, in the form of one or several still or moving images/pictures.

For example, according to one embodiment, location descriptor information may be presented by the information presentation unit 110 within the contact application above or below the label "LOCATION". In the example of FIG. 7, the contact information belongs to "BERTIL PERSSON".

According to a variation of the embodiment, the location descriptor information may be presented in a calendar application, in which "PRESENCE" already may be available as one option of obtaining availability information.

In yet a different alternative, an application combining the contact and the calendar, may be provided, in which location descriptor information of different kinds may be given emphasis.

It is emphasized that aspects consistent with the invention may be varied in many ways, of which the alternative embodiments described herein are only a few examples. These different embodiments are hence non-limiting examples. The scope of this present invention, however, is only limited by the claims and their equivalents.

For example, according to yet a different embodiment, the portable communication device used in implementations described above with respect to receiving and/or providing location information may comprise a personal digital assistant (PDA) or a hand held communication device, such as a combined MP3-camera-communication device, to mention a few examples only.

Aspects of the invention have thus been described with respect to methods for obtaining and/or providing location descriptor information, a portable communication device, an electronic communication device and computer program products, sharing the following overall advantages of providing means to quickly determine where a user of a portable communication device is located. In addition, some aspects of the invention advantageously provide for obtaining or receiving location descriptor information prior to setting up a voice or video communication session between parties.

What is claimed is:

1. A method comprising:
   receiving, by a server device, a request for location descriptor information, of a particular specificity, associated with a first portable communication device;
   accessing, by the server device and in response to the request, stored first location information indicative of a geographic location of the first portable communication device;
   determining, by the server device, that the first location information does not have the particular specificity;
   determining, by the server device, second location information, having the particular specificity, indicative of the geographic location of the first portable communication device;
   obtaining, by the server device, an image file or video file depicting a location associated with the second location information; and
   sending, by the server device, the image file or the video file at least to a network service provider of a second portable communication device for enabling presentation of the image file or the video file by the second portable communication device.

2. The method according to claim 1, where receiving the request comprises receiving the request from the second portable communication device.

3. A server device comprising:
   a memory comprising instructions to:
      receive a request, from a first portable communication device, for location descriptor information, of a particular specificity, associated with a second portable communication device,
      access stored first location information, in response to the request, indicative of a geographic location for the second portable communication device,
      determine that the first location information does not have the particular specificity,
      determine second location information, having the particular specificity, indicative of the geographic location of the second portable communication device,
      obtain an image or video file depicting a location of the second portable communication device based on the second location information, and
      send the image or video file at least to a network service provider of the first portable communication device, for enabling presentation of the image or video file by the first portable communication device; and
   a processor, coupled to the memory, to execute the instructions.

4. A computer program product comprising a non-transitory computer readable storage device having stored thereon computer readable code, to make a computer or a portable communication device execute, when said computer readable code is loaded in the computer or the portable communication device, a method comprising:
   sending a request, from a first portable communication device, for location descriptor information, of a particular specificity, indicative of a geographic location associated with a second portable communication device, to a network service provider associated with the second portable communication device, for obtaining location descriptor information, without establishing a call with the second portable communication device;
   receiving, from the network service provider, second location descriptor information, having the particular specificity, the second location descriptor information having been determined by the network service provider after a determination that first location descriptor information, associated with the second portable communication device, lacks the particular specificity, where the location descriptor information comprises an image or video file depicting a geographic location associated with the second portable communication device; and
   enabling presentation of the image or video file to allow a user of the first portable communication device to automatically gain information without further processing by the user.

5. A communication device, comprising:

a transmitter, implemented, at least in part, as hardware, to transmit a request for location information, of a particular specificity, indicative of a geographic location associated with another communication device, without establishing a call with the other communication device;

a receiver, implemented, at least in part, as hardware, to receive second location information, including an image file or video file, the second location information having been determined after a determination that first location information, associated with the other communication device, lacks the particular specificity in response to the request, the image file or video file depicting a geographic location, having the particular specificity, at which the other communication device is located, the image file or video file including information identifying the location and a time at the location, and where the image or video file has been pre-selected by a user of the other communication device; and a display, implemented, at least in part, as hardware, to display the received image file or video file and the information included in the image file or the video file.

6. The communication device of claim 5, where the image file or video file comprises personalized information provided by the user of the other communication device.

7. The method communication device of claim 5, where the display is to display the received image file or video file prior to commencing with an audio communication session with a user of the other communication device.

* * * * *